US010117201B2

(12) United States Patent
Zuniga et al.

(10) Patent No.: US 10,117,201 B2
(45) Date of Patent: Oct. 30, 2018

(54) METHOD AND APPARATUS OF ENABLING MULTI BAND TRANSMISSION

(71) Applicant: InterDigital Technology Corporation, Wilmington, DE (US)

(72) Inventors: Juan Carlos Zuniga, Ville St. Laurent (CA); Sudheer A. Grandhi, Pleasanton, CA (US); Mohammed Sammour, Alrabieh-Amman (JO); Catherine M. Livet, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 77 days.

(21) Appl. No.: 15/436,033

(22) Filed: Feb. 17, 2017

(65) Prior Publication Data

US 2017/0164307 A1 Jun. 8, 2017

Related U.S. Application Data

(63) Continuation of application No. 15/091,277, filed on Apr. 5, 2016, now Pat. No. 9,578,615, which is a
(Continued)

(51) Int. Cl.
*H04W 72/04* (2009.01)
*H04W 56/00* (2009.01)
(Continued)

(52) U.S. Cl.
CPC ........ *H04W 56/001* (2013.01); *H04B 1/7183* (2013.01); *H04L 1/005* (2013.01);
(Continued)

(58) Field of Classification Search
CPC ............ H04W 72/0406; H04W 56/001; H04B 1/7183; H04B 1/005; H04L 5/007; H04L 27/2601
See application file for complete search history.

(56) References Cited

U.S. PATENT DOCUMENTS 7,301,924 B1 11/2007 Gurbuz et al.
7,903,620 B2 3/2011 Rudolf et al.
(Continued)

FOREIGN PATENT DOCUMENTS

EP 1 615 384 1/2006
WO 04/077691 9/2004
(Continued)

OTHER PUBLICATIONS

Chung et al., "Modulation, Coding and Signal Processing for Wireless Communications—Signaling and Multiple Access Techniques for Ultra Wideband 4G Wireless Communications Systems," IEEE Wireless Communications, vol. 12, No. 2, pp. 46-55 (Apr. 1, 2005).
(Continued)

*Primary Examiner* — Hoon J Chung
(74) *Attorney, Agent, or Firm* — Volpe and Koenig, P.C.

(57) ABSTRACT

A method for multi-band operation by a first transmit/receive unit (TRU) is disclosed. The method may comprise monitoring a plurality of frequency bands including a first band and a second band. A first beacon may be received on the first band and a determination may be made, based on the received first beacon, of a first beacon period start time. The first beacon period start time may correspond to beacons transmitted by the second TRU. A second beacon period start time may be determined, based on the received first beacon, wherein the second beacon period start time corresponds to a beacon for transmission by the first TRU. A beacon signal may be transmitted in a second band, by the first TRU, wherein the beacon signal is timing aligned with beacon signals of the second TRU. The first band and the second band may be adjacent radio bands.

14 Claims, 3 Drawing Sheets

Related U.S. Application Data continuation of application No. 13/774,345, filed on Feb. 22, 2013, now Pat. No. 9,337,891, which is a continuation of application No. 11/999,409, filed on Dec. 4, 2007, now Pat. No. 8,385,319.

(60) Provisional application No. 60/868,448, filed on Dec. 4, 2006.

(51) Int. Cl.
   *H04L 1/00*      (2006.01)
   *H04B 1/7183*    (2011.01)
   *H04L 5/00*      (2006.01)
   *H04L 27/26*     (2006.01)

(52) U.S. Cl.
   CPC ........ *H04L 5/0007* (2013.01); *H04L 27/2601* (2013.01); *H04L 27/2655* (2013.01); *H04W 72/0406* (2013.01)

(56) References Cited

U.S. PATENT DOCUMENTS

| | | | |
|---|---|---|---|
| 8,018,912 | B2 | 9/2011 | Habetha |
| 8,385,319 | B2 | 2/2013 | Zuniga et al. |
| 9,337,891 | B2 * | 5/2016 | Zuniga ................ H04B 1/7183 |
| 9,578,615 | B2 * | 2/2017 | Zuniga ................ H04B 1/7183 |
| 2003/0038710 | A1 | 2/2003 | Manis et al. |
| 2004/0082356 | A1 * | 4/2004 | Walton .................. H04B 7/022 455/522 |
| 2005/0083896 | A1 | 4/2005 | Hong et al. |
| 2005/0085265 | A1 | 4/2005 | Laroia et al. |
| 2005/0185669 | A1 | 8/2005 | Welborn et al. |
| 2005/0249170 | A1 | 11/2005 | Salokannel et al. |
| 2005/0288021 | A1 | 12/2005 | Hunkeler |
| 2006/0018287 | A1 | 1/2006 | Walton et al. |
| 2006/0268908 | A1 * | 11/2006 | Wang .................... H04L 41/046 370/401 |
| 2007/0274206 | A1 | 11/2007 | Habetha et al. |
| 2008/0043863 | A1 | 2/2008 | Ji et al. |
| 2009/0041003 | A1 | 2/2009 | Challapali et al. |
| 2010/0290387 | A1 | 11/2010 | Chou et al. |

FOREIGN PATENT DOCUMENTS

| | | |
|---|---|---|
| WO | 06/111826 | 10/2006 |
| WO | 06/120648 | 11/2006 |
| WO | 06/122233 | 11/2006 |

OTHER PUBLICATIONS

ECMA, "High Rate Ultra Wideband PHY and MAC Standard," ECMA-368 (Dec. 2005).

Hiertz et al., "IEEE 802.15.3a Wireless Personal Area Networks—The MBOA Approach," European Wireless Conference, XP002329983, pp. 1-7 (Apr. 1, 2005).

High Rate Ultra Wideband PHY and MAC Standard; ECMA International; Standard ECMA-368; 1$^{st}$ Edition, Dec. 2005.

Information technology—Telecommunications and information exchange between systems—Local and metropolitan area networks—Specific requirements—Part 11: Wireless LAN Medium Access Control (MAC) and Physical Layer (PHY) Specifications, ANSI/IEEE Std 802.11, 1999 Edition (R2003) (Jun. 12, 2003).

MAC-PHY Interface for ECMA-368; ECMA International; Standard ECMA-369; 1$^{st}$ Edition, Dec. 2005.

Wang et al., "Media Access Control Protocols Review for UWB Networks," 1$^{st}$ International Symposium on Pervasive Computing and Applications, XP031014533, pp. 769-774 (Aug. 1, 2006).

* cited by examiner

METHOD AND APPARATUS OF ENABLING MULTI BAND TRANSMISSION

CROSS REFERENCE TO RELATED APPLICATIONS

This application is a continuation of U.S. application Ser. No. 15/091,277, filed Apr. 5, 2016 which is a continuation of U.S. application Ser. No. 13/774,345, filed Feb. 22, 2013, which issued as U.S. Pat. No. 9,337,891 on May 10, 2016, which is a continuation of U.S. application Ser. No. 11/999,409, filed Dec. 4, 2007, which issued as U.S. Pat. No. 8,385,319 on Feb. 26, 2013, which claims the benefit of U.S. Provisional Application No. 60/868,448, filed Dec. 4, 2006, which are incorporated by reference as if fully set forth.

FIELD OF INVENTION

The present invention is related to wireless communication systems.

BACKGROUND

Ultra-wideband (UWB) technology is standardized under the ECMA 368/369 specification. In particular, the ECMA 368/369 standard specifies a distributed medium access control (MAC) Layer and a physical (PHY) Layer for WTRUs that support data rates up to 480 megabits per second (Mbps). The PHY layer is designed to operate in the 3.1 to 10.6 gigahertz (GHz) frequency spectrum and has been accepted as a common platform for technologies such as next generation Bluetooth®, wireless universal serial bus (WUSB) and wireless Firewire (IEEE 1394).

The ECMA 368 PHY uses a multi-band orthogonal frequency division modulation (MB OFDM) to transmit information. The ECMA 368 PHY specification operating frequency spectrum is divided into 5 radio band groups with each radio band, or equivalent carrier spacing, being 528 MHz. The first four radio band groups have three radio bands of 528 MHz, while the fifth band group includes two radio bands of 528 MHz each. The capability to operate in the first radio band group is mandatory. However, operating in the other radio band groups is optional.

The ECMA 386 MAC layer has a completely distributed architecture and provides MAC services to a higher layer protocols or to an adaptation layer. There is no central coordinating device and each device supports all MAC functions. Devices within radio range coordinate with each other using periodic beacon frames. These beacon frames provide network timing, scheduling and capability information, as well as other information and functions.

One way in which the beacon frames provide information is via an information element (IE) included in the beacon frame or in a command frame. This IE may include a beacon period (BP) switch IE and/or a distributed reservation protocol (DRP) IE. The BP switch IE, in particular, may include an element ID field, a length field, a BP move countdown field, a beacon slot offset field, and a BP start (BPST) offset field.

In addition, MAC superframe structures from ECMA 368 include beacon periods (BPs) and medium access slots (MASS).

One issue with the mechanism and rates currently supported by the ECMA 368/369 standards is that it may be inadequate to support applications such as high definition TV (HDTV) which requires a data rate of 1 Gbps or greater, depending on the HDTV format. It would therefore be beneficial to provide a method and apparatus to enable multi-band transmission that can enable higher data rates in next generation (NG) UWB.

SUMMARY

A method for multi-band operation by a first transmit/receive unit (TRU) is disclosed. The method may comprise monitoring a plurality of frequency bands including a first band and a second band. A first beacon may be received on the first band and a determination may be made, based on the received first beacon, of a first beacon period start time. The first beacon period start time may correspond to beacons transmitted by the second TRU. A second beacon period start time may be determined, based on the received first beacon, wherein the second beacon period start time corresponds to a beacon for transmission by the first TRU. A beacon signal may be transmitted in a second band, by the first TRU, wherein the beacon signal is timing aligned with beacon signals of the second TRU. The first band and the second band may be adjacent radio bands.

BRIEF DESCRIPTION OF THE DRAWINGS

A more detailed understanding may be had from the following description, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
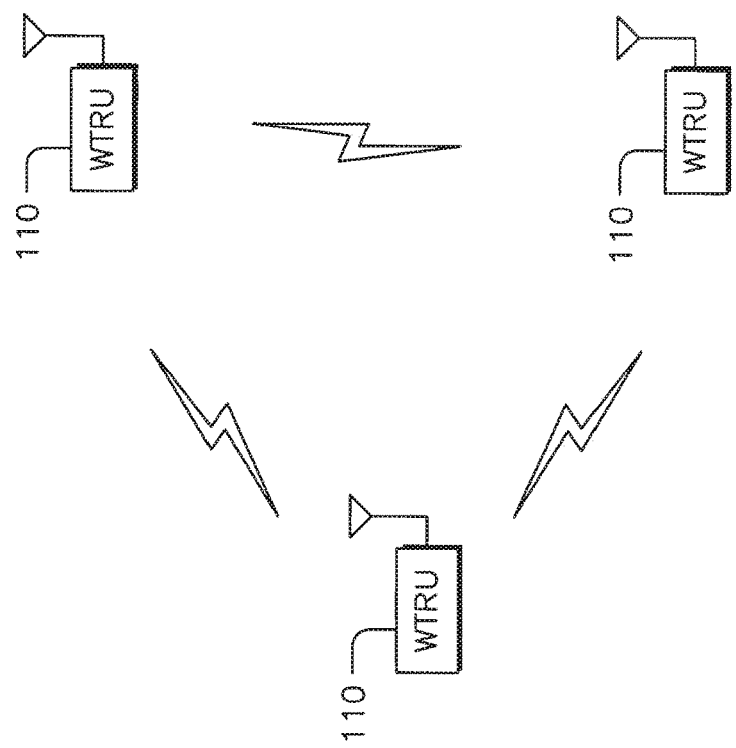
FIG. 1 shows an example of a distributed wireless communication system including a plurality of WTRUs in communication with one another.

FIG. 1 shows an example of a distributed wireless communication system 100 including a plurality of WTRUs 110. As shown in FIG. 1, the WTRUs 110 are all in communication with one another. However, although three WTRUs 110 are shown in communication with one another, it should be noted that any number of WTRUs 110 may be included in the distributed wireless communication system 100 and every WTRU 110 may or may not be in communication with every other WTRU 110.

Figure 2:
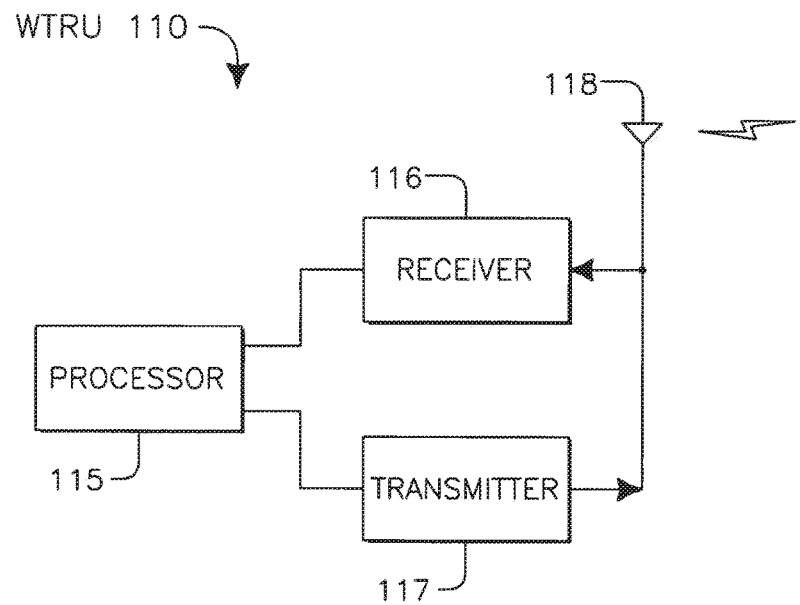
FIG. 2 is a functional block diagram of a WTRU of FIG. 1.

FIG. 2 is a functional block diagram of a WTRU 110. In addition to the components that may be found in a typical WTRU, the WTRU 910 includes a processor 115, a receiver 116, a transmitter 117, and an antenna 118. The processor 115 is configured to enable multi-band transmission, as described by way of example in more detail below. The receiver 116 and the transmitter 117 are in communication with the processor 115. The antenna 118 is in communication with both the receiver 116 and the transmitter 117 to facilitate the transmission and reception of wireless data. Although only one transmitter, receiver and antenna are depicted in the WTRU 110 as shown in FIG. 2, the WTRU 110 may include a plurality of transmitters, receivers and antennas.

Figure 3:
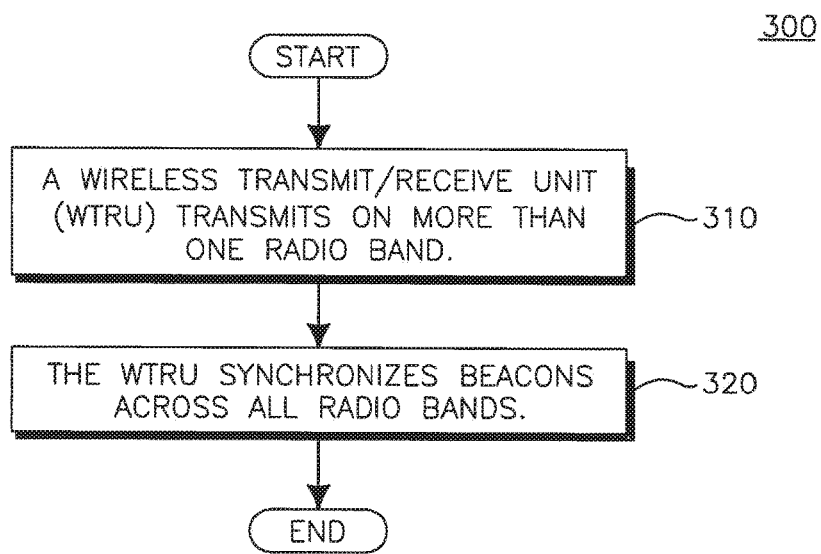
FIG. 3 is a flow diagram of a method of enabling multi-band transmission.

FIG. 3 is a flow diagram of a method 300 of enabling multi-band transmission. Implementation of the method 300 provides and increased data rate for WTRUs implementing NG UWB technology. Additionally, bandwidth may be expanded by utilizing more than one radio band, which is currently 528 MHz.

In step 310, the WTRU 110 transmits a beacon on more than one radio band. The beacon includes information relating to coordination of transmission with the WTRU 110 on more than one radio bands. The transmission may occur on adjacent radio bands or non-adjacent radio bands, and the radio bands may include a single radio or dual-radio option.

The WTRU 110 coordinates, or synchronizes, beacons across all of the radio bands (step 320). This synchronization may include aligning beacon period (BP) start times for different beacons across bands. Alternatively, the WTRU 110 may have knowledge of the relative offsets among the BP start times in the different bands. Because a BP expands for longer than the beacon transmission duration, partial time overlapping of BPs can occur. Additionally, non-overlapping beacon transmissions can be achieved.

If the WTRU 110 includes a single radio transmitter, the WTRU 110 transmits on more than one radio band to increase the data rate. For example, the WTRU 110 will transmit on adjacent radio bands. In this case, the WTRU 110 synchronizes (step 1020) the beacon by aligning the beacon period start time in all radio bands of an expanded bandwidth transmission (EBT).

In another scenario, the WTRU 110 may transmit on a first radio band, then switch, or "hop," to a second radio band where the WTRU 110 monitors for the beacon in the BP and transmits on the second radio band. An example of this scenario may include where the WTRU 110 including a single radio utilizes resources on multiple bands, such as half of the medium access slots (MASS) on one radio band and half on another. In this case, the BPs on different bands may not be aligned, but may have a known offset. The WTRU 110 in this scenario utilizes both beacons at different points in time. This scenario may also facilitate reserving resources via DRP on multiple bands using one beacon, such as a master beacon.

Alternatively, the WTRU 110 may have EBT utilized in the non-beacon period, (i.e., non-BP), only. For example, the WTRU 110 may utilize a single radio transmitter that transmits simultaneously on two adjacent bands with single radio band transmissions occurring during the BP. This will enable proper reception of the beacon transmissions.

Figure 4:
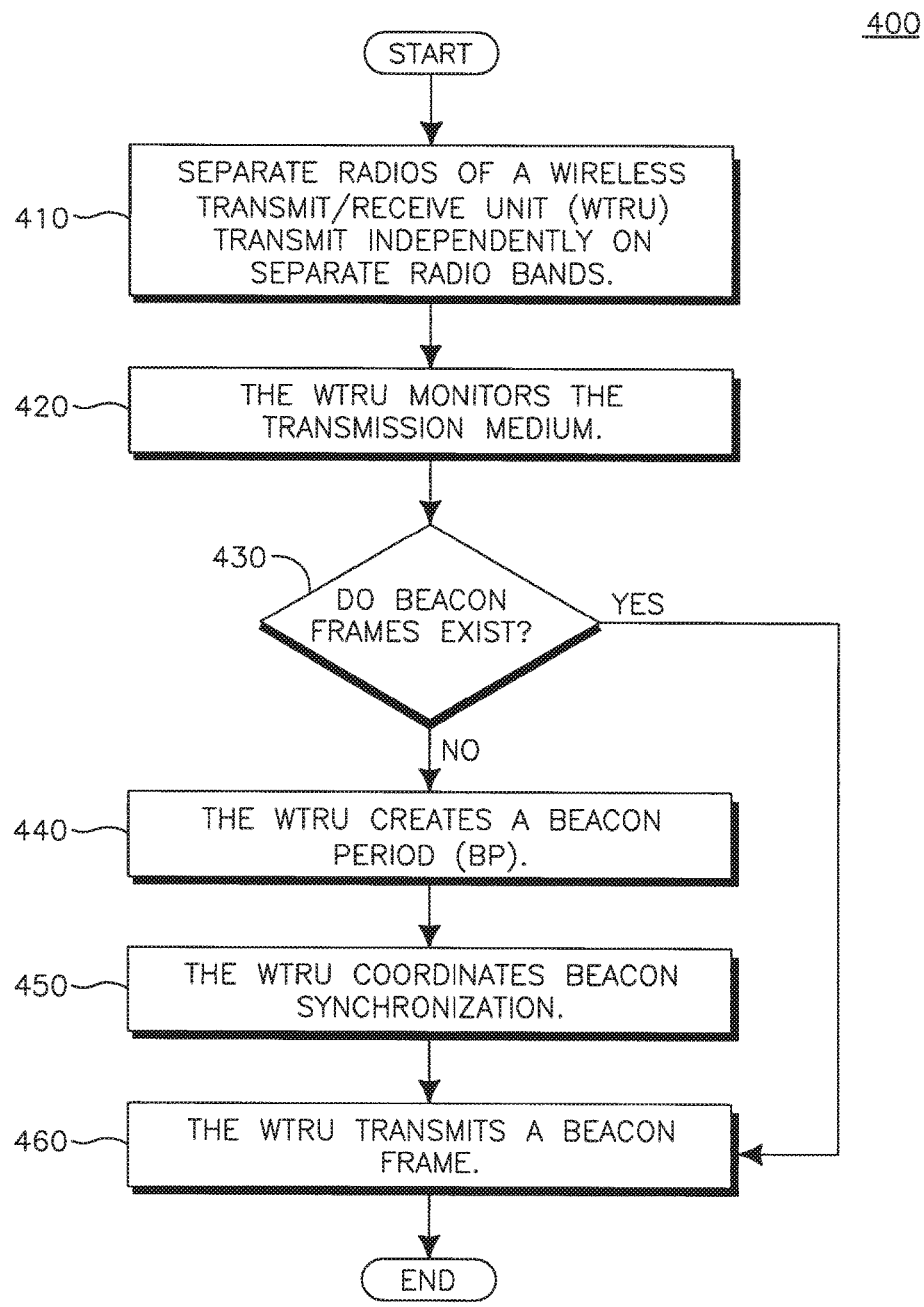
FIG. 4 is a flow diagram of an alternative method of enabling multi-band transmission.

In another scenario, the WTRU 110 may include more than one radio transmitter. FIG. 4 is a flow diagram of an alternative method 400 of enabling multi-band transmission. As depicted in the method 400, the WTRU 110 includes a plurality of radio transmitters.

In step 410, separate radios, or radio transmitters, of the WTRU 110 transmit independently on separate radio bands. For example, a first radio may transmit on one radio band while a second radio transmits on a second radio band. In this case, there may be no need for BP synchronization or alignment, since the two beacons are transmitted over separate radio bands and do not conflict with one another.

The WTRU 110 monitors the transmission medium (step 420) for the existence of a beacon frame (step 430). If no beacon frames exist (step 430), then the WTRU 110 creates a BP (step 440). In particular, a BP start time alignment in all bands of an EBT is utilized so the reservations of an EBT for the WTRU 110 in all bands are aligned. One scenario in which this may be achieved is to reuse the BP switch IE to synchronize BPs across all radio bands.

The WTRU 110 coordinates the beacon synchronization across all the bands (step 450). In one example, a WTRU 110 equipped for EBT transmits a beacon frame in a given radio band according to its own BP (step 460). Other WTRUs that receive this beacon frame align their BPs with a BP switch IE. For example, before switching to the new BP, the WTRU 110 may transmit a beacon on its previous BP where the BP switch IE is added to indicate the move to the new BP. The EBT equipped WTRU 110 may transmit simultaneously in all radio bands, or in sequence from radio band to radio band. Accordingly, the result is that the BPs in all bands are aligned to the BP of the EBT WTRU 110. This may require multiple superframes to perform in this manner.

Alternatively, the WTRU 110 may introduce a new EBT BP switch IE to the other WTRUs in the system that instructs them to synchronize their BPs to the value specified at a time specified in the EBT BP switch IE. Accordingly, the new EBT switch IE includes, in a field, a new beacon period timing and a time to change the BP. Additionally, the WTRU 110 may provide EBT capabilities, such as default channels and default expanded channels in the beacon transmitted.

Although features and elements are described above in particular combinations, each feature or element can be used alone without the other features and elements or in various combinations with or without other features and elements. The methods or flow charts provided herein may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for multi-band operation by a first transmit/receive unit (TRU), the method comprising:

monitoring a plurality of frequency bands, wherein the plurality of frequency bands include at least a first band and a second band;

receiving on the first band, by the first TRU from a second TRU, a first beacon;

determining, based on the received first beacon, a first beacon period start time, wherein the first beacon period start time corresponds to beacons transmitted by the second TRU;

determining, based on the received first beacon, a second beacon period start time, wherein the second beacon period start time corresponds to a beacon for transmission by the first TRU; and transmitting in a second band, by the first TRU, a beacon signal, wherein the beacon signal is timing aligned with beacon signals of the second TRU;

wherein the first band and the second band are adjacent radio bands.

2. The method of claim 1, wherein the first beacon period start time and second beacon period start time are aligned in time.

3. The method of claim 1, wherein the transmission of the beacon signal, by the first TRU, is an orthogonal frequency division modulation (OFDM) transmission.

4. The method of claim 1, wherein each one of the plurality of frequency bands are located in the radio frequency (RF) spectrum.

5. The method of claim 1, wherein the first TRU is a wireless TRU (WTRU).

6. The method of claim 1, wherein the second TRU is a WTRU.

7. The method of claim 1, further comprising:
determining, from the first beacon, a capability of the second TRU.

8. A first transmit/receive unit (TRU) configured for multi-band operation, the first TRU comprising:

circuitry configured to monitor a plurality of frequency bands, wherein the plurality of frequency bands include at least a first band and a second band;

a receiver configured to receive on the first band, by the first TRU from a second TRU, a first beacon;

circuitry configured to determine, based on the received first beacon, a first beacon period start time, wherein the first beacon period start time corresponds to beacons transmitted by the second TRU;

circuitry configured to determine, based on the received first beacon, a second beacon period start time, wherein the second beacon period start time corresponds to a beacon for transmission by the first TRU; and a transmitter configured to transmit in a second band, by the first TRU, a beacon signal, wherein the beacon signal is timing aligned with beacon signals of the second TRU;

wherein the first band and the second band are adjacent radio bands.

9. The first TRU of claim 8, wherein the first beacon period start time and second beacon period start time are aligned in time.

10. The first TRU of claim 8, wherein the transmission of the beacon signal, by the first TRU, is an orthogonal frequency division modulation (OFDM) transmission.

11. The first TRU of claim 8, wherein each one of the plurality of frequency bands are located in the radio frequency (RF) spectrum.

12. The first TRU of claim 8, wherein the first TRU is a wireless TRU (WTRU).

13. The first TRU of claim 8, wherein the second TRU is a WTRU.

14. The method of claim 8, further comprising:
determining, from the first beacon, a capability of the second TRU.

* * * * *